United States Patent [19]

Thomas

[11] 3,890,020
[45] June 17, 1975

[54] WHEEL AND BEARING ASSEMBLY
[75] Inventor: Walter B. Thomas, Pittsburgh, Pa.
[73] Assignee: Koppers Company, Inc., Pittsburgh, Pa.
[22] Filed: May 21, 1973
[21] Appl. No.: 361,887

[52] U.S. Cl. ............... 308/16; 308/191; 308/237 A
[51] Int. Cl. ............................................ F16c 35/12
[58] Field of Search .......... 308/191, 190, 237 A, 16

[56] References Cited
UNITED STATES PATENTS
583,911  6/1897  Knowles............................. 308/191
2,666,676  1/1954  Rhine.................................. 308/211
FOREIGN PATENTS OR APPLICATIONS
687,858  2/1940  Germany ........................... 308/211

| 828,998 | 3/1938 | France | 308/237 A |
| 860,076 | 12/1952 | Germany | 308/187.1 |

Primary Examiner—Evon C. Blunk
Assistant Examiner—Robert Saifer
Attorney, Agent, or Firm—Sherman H. Barber; Olin E. Williams; Oscar B. Brumback

[57] ABSTRACT

Sinter machine pallet wheels and bearing arrangement are constructed so that the wheels, bearings, and seals may be removed from the pallet for maintenance without exposing the bearings to the dirty atmosphere prevailing near the sintering machine. The wheel, bearings, and seals are combined into a single removable assembly without exposing the bearings to dirt.

3 Claims, 3 Drawing Figures

WHEEL AND BEARING ASSEMBLY

BRIEF SUMMARY OF THE INVENTION

A wheel and bearing assembly includes a sleeve that is adapted to fit onto a shaft. A bearing is mounted to the sleeve with the wheel surrounding the sleeve and cooperating with the bearing. A plate is fastened to the sleeve for retaining the wheel rotatably in place on the sleeve, and the plate is adapted to be fastened to the shaft, thereby holding the assembly in place on the shaft.

For a further understanding of the invention and for features and advantages thereof, reference may be made to the following description and the drawing which illustrates a preferred embodiment of equipment in accordance with the invention.

DETAILED DESCRIPTION

Figure 1:
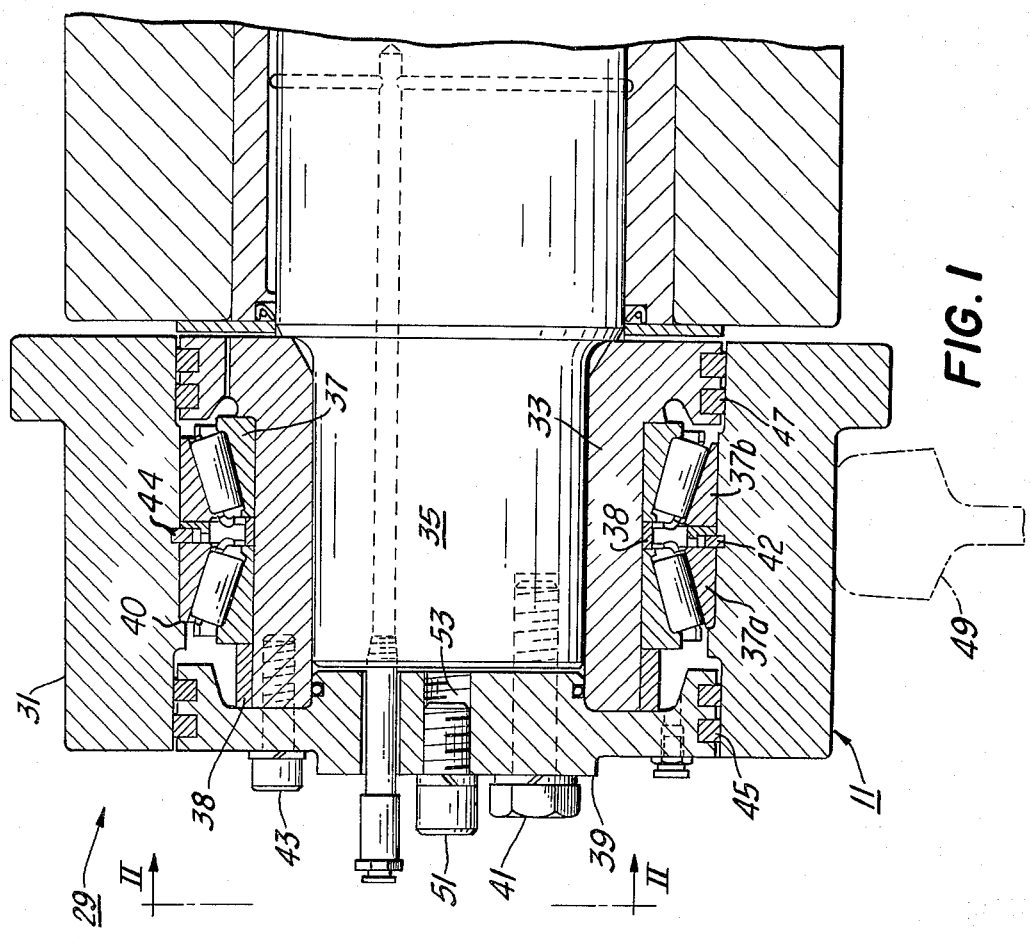
FIG. 1 is a vertical cross-sectional view of a sinter pallet wheel in accordance with the invention.
Figure 2:
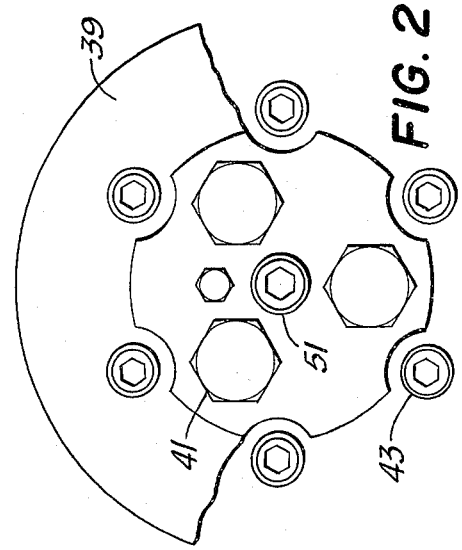
FIG. 2 is a view along line II—II of FIG. 1.

Referring to FIG. 1, there is shown an improved wheel and bearing assembly. Such an assembly may be used in many installations. For the purposes of this disclosure, one such installation is a sinter pallet wheel 11 that is easily and quickly replaceable when bearing failure or other reason dictates that a wheel or bearing must be replaced while the sinter machine, of which the pallet is a part, is in operating service. This disclosure, in relation to a sinter machine pallet, is not to be considered as a limitation of the applicability of such wheel and bearing assembly. Whenever a sinter wheel or bearing, or both, have to be replaced in present designs of sinter pallet, it is necessary to temporarily stop the sinter machine; remove the end seal cap; remove the bearings; wheel and seals; install new bearings and seals; replace the wheel on the pallet shaft; and then replace the end seal cap. These several operations are usually carried out on the spot, and, as one having skill in the art knows, the ambient at a sinter plant is very dirty. Consequently, dirt invariably enters the bearing cages, and there is no way to prevent this condition while changing bearings and wheel at the sinter machine site.

Figure 3:
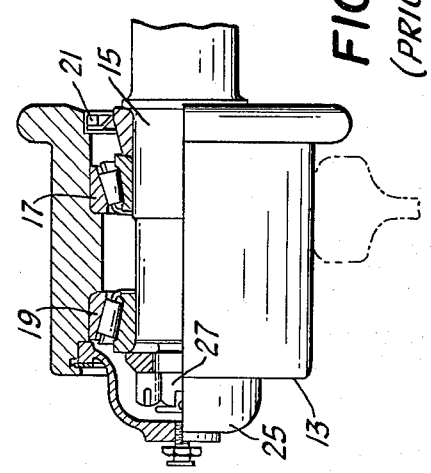
FIG. 3 is a view of a prior art type sinter pallet wheel that is similar to the view shown in FIG. 1.

Such a prior art sinter pallet wheel 13 is shown in FIG. 3. There, wheel 13 is supported on shaft 15 by a pair of conventional tapered roller bearings 17, 19. End seal 21 is provided at one end of the wheel itself, and an end-seal cap 25 covers the nut 27 on the threaded end of the shaft 15. It is clear that each of the bearings 17, 19, the end seal 21, the end seal cap 25, and the nut 27 must be separately removed when wheel 13 is removed. So, too, when the wheel 13 is replaced, it is necessary to install the bearings and seal separately, and then to tighten nut 27. Thereafter, the end seal cap 25 can be installed. All of this work is usually done at the sinter machine site, in the dirty ambient conditions, which results in the bearings carrying dirt and foreign matter when the wheel 13 is replaced. Either this procedure is carried out about as described, or the entire pallet is removed and then taken to a shop area where the bearing can be replaced in a relatively dirt-free ambient. In any event, the wheels for conventional sinter pallets comprise a plurality of individual parts that must be handled separately.

In contrast to the prior art sinter pallet wheel, the present invention comprises a unitized wheel and bearing assembly that may be quickly and easily removed and installed at the sinter machine site. Because the wheel and bearing assembly are packaged, no dirt or other foreign matter enters the bearing that causes undue wear and damage.

In FIG. 1, a wheel and bearing assembly 29, in accordance with the present invention, comprises: a sinter pallet wheel 31; a sleeve 33 that is disposed over the end portion of a sinter pallet shaft 35; a conventional bearing 37 such as Timken J-line bearing that is mounted to the sleeve 33 and that coacts with wheel 31; a cylindrical spacer 38 on shaft 35; and an end plate 39 that is bolted, as at 41, to the shaft 35, and to the sleeve 33, as at 43.

The bearing 37 comprises actually two individual bearing units 37a, 37b which are separated by a spacer piece 38. The bearing unit 37a abuts against a shoulder 40 on the inner surface of the wheel 31 whereby the wheel 31 is prevented from moving toward the right, as viewed in FIG. 1. The spacer piece 38 is recessed to receive a conventional type of snap ring 42 that fits into a groove 44 in the inner surface of the wheel 31. The snap ring 42 thereby effectively prevents the wheel 31 from moving toward the left, as viewed in FIG. 1. By means of a special tool known to those skilled in the art, the snap ring can be easily removed so that the wheel and bearing assembly can be completely disassembled, whenever necessary or desirable.

Associated with both the sleeve 33 and the end plate 39 are sets of conventional piston rings 45, 47, such as the step-seal manufactured and sold by Koppers Company, Inc., Pittsburgh, Pa.

Those skilled in the art will recognize that the wheel and bearing assembly 29 may be quickly and easily removed, and another assembly quickly and easily installed in the following manner. The sinter pallet (not shown) is first jacked up to raise the wheel 31 above rail 49 on which the wheel 31 normally rides in service. Then, the three main bolts 41 are removed, and allen screw 51, which is fitted in threaded hole 53 in the end plate 39, is also removed. Now, a jacking screw (not shown) is threaded into hole 53, and by continuing to turn the jacking screw after it engages the end of the shaft 35, the wheel and bearing assembly are urged off the shaft 35.

Thereupon, at the sinter machine site, a replacement wheel and bearing assembly can be urged onto the shaft, the three main bolts can be replaced, and the sinter pallet can be lowered until the wheel engages the rail.

The wheel and bearing assembly that was removed can be taken to a shop area where, in a relatively clean ambient, a new bearing can be installed. Bolts 43 must be removed to allow the end plate and bearing 37 to be removed. Thereafter, a new bearing can be installed, and the end plate replaced. Such wheel and bearing assembly is then ready for use again.

From the foregoing description of one embodiment of the invention, those skilled in the art should recognize many important features and advantages of it, among which the following are particularly significant:

That the wheel is combined with a bearing and shaft sleeve as a packaged unit;

That the packaged unit can quickly and easily be installed on and removed from a shaft such as a pallet wheel shaft when necessary of desirable; and That such a packaged unit prevents the usual bearing contamination that occurs when conventional type wheel and bearings are removed and replaced at sites where the ambient is dirty, such as at the sinter machine site.

Although the invention has been described herein with a certain degree of particularity, it is understood that the present disclosure has been made only as an example and that the scope of the invention is defined by what is hereinafter claimed.

What is claimed is:

1. A wheel and bearing assembly adapted for installation on a shaft comprising:
   a. a sleeve that is slideable onto said shaft;
   b. a bearing supported on said sleeve;
   c. a wheel surrounding and cooperating with said bearing;
   d. means coacting with said bearing and with said wheel for maintaining said wheel and bearing in relative operative positions;
   e. a plate secured by fasteners to said sleeve;
   f. means coacting with said bearing and with said plate for maintaining said wheel and bearing assembly in operative position on said sleeve;
   g. sealing means supported by said plate that coacts with said wheel and forms a protective seal for said bearing; and
   h. sealing means supported by said sleeve that coacts with said wheel and forms a protective seal for said bearing.

2. The invention of claim 1 including:
   a. means for securing said plate to said shaft and thereby holding said wheel and bearing assembly operatively on said shaft.

3. A wheel and bearing assembly for installation on a shaft comprising:
   a. a sleeve that is adapted to fit onto said shaft;
   b. a bearing mounted to said sleeve and cooperating with
   c. a wheel surrounding said sleeve and cooperating with said bearing;
   d. a plate secured to said sleeve for holding said wheel retatably in place on said sleeve; and
   e. means on said plate for exerting an axial force against said shaft to urge said wheel and bearing said assembly off said shaft when said assembly is installed thereon.

* * * * *